Figure 1:
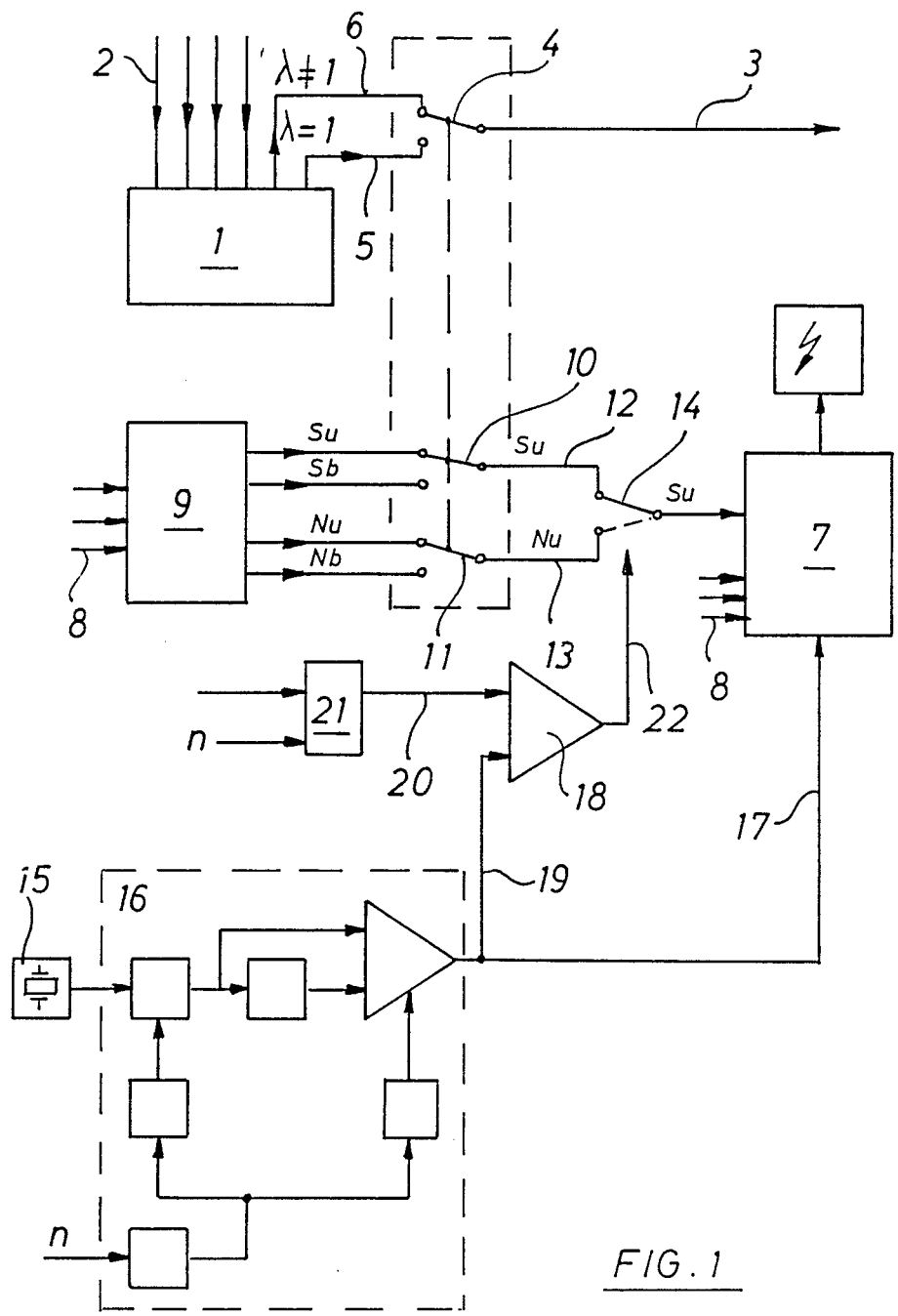

United States Patent [19] [11] Patent Number: 4,854,286
Chemnitzer [45] Date of Patent: Aug. 8, 1989

[54] DEVICE FOR ADAPTING THE AIR/FUEL METERING SYSTEM AND THE IGNITION SYSTEM OF AN INTERNAL COMBUSTION ENGINE TO ENABLE THE ENGINE TO RUN WITH ALL NORMALLY AVAILABLE GRADES OF PETROL (GASOLINE) FUEL

[75] Inventor: Eberhard Chemnitzer, Lehrensteinsfeld, Fed. Rep. of Germany

[73] Assignee: Audi AG, Fed. Rep. of Germany

[21] Appl. No.: 187,523
[22] PCT Filed: Sep. 3, 1987
[86] PCT No.: PCT/DE87/00400
 § 371 Date: Apr. 6, 1988
 § 102(e) Date: Apr. 6, 1988
[87] PCT Pub. No.: WO88/02069
 PCT Pub. Date: Mar. 24, 1988

[30] Foreign Application Priority Data
Sep. 11, 1986 [DE] Fed. Rep. of Germany ....... 3630907

[51] Int. Cl.⁴ .................. F02P 5/14; F02M 37/04
[52] U.S. Cl. .................. 123/425; 123/486; 123/1 A; 123/1 R; 123/406; 123/435; 123/515
[58] Field of Search .......... 123/425, 486, 1 A, 1 R, 123/406, 435, 575, 146.5 A

[56] References Cited
U.S. PATENT DOCUMENTS

Re. 31,218  4/1983  Hicks et al. ............... 123/1 A
2,958,317  11/1960  McNally ................... 123/515
3,903,856   9/1975  McDougal et al. ........... 123/425
4,399,780   8/1983  Lassanske et al. .......... 123/146.5 A
4,610,232   9/1986  Iwata ..................... 123/425
4,615,319  10/1986  Tomisawa .................. 123/486
4,640,254   2/1987  Ninomiya .................. 123/486
4,671,242   5/1987  Akiyama et al. ............ 123/486

FOREIGN PATENT DOCUMENTS 2109859  6/1983  United Kingdom ............. 123/425
2156905 10/1985  United Kingdom ............. 123/425
2169957  7/1986  United Kingdom ............. 123/425

Primary Examiner—Raymond A. Nelli
Attorney, Agent, or Firm—Kane, Dalsimer, Sullivan, Kurucz, Levy, Eisele and Richard

[57] ABSTRACT

The invention refers to a device for adapting the fuel-/air metering system and the ignition system of an internal combustion engine to enable the engine to be operated with all normally available grades of petrol (gasoline). The invention provides for a manual facility for switching-over the fuel/air metering system from a fuel/air map for $\lambda=1$ (operation with three-way catalytic converter and $\lambda$ sensor) with unleaded fuel to a fuel/air map for $\lambda\neq1$. Additionally, a manual facility is provided for switching over or selecting two out of a total of four ignition timing maps for premium grade unleaded fuel ($s_u$), regular grade unleaded ($n_u$), premium grade leaded ($s_b$) and regular grade leaded ($n_b$) (switch contacts 4, 10 11). An automatic switch-over function between the ignition timing maps $s_u/n_u$ and $s_b/n_b$ is provided by means of a second automatic switch unit (14) operating in accordance with a threshold value 18 of an operating parameter of the combustion engine. The threshold value is preferably taken from a knock control system, giving the knock frequency or knock intensity.

8 Claims, 4 Drawing Sheets

DEVICE FOR ADAPTING THE AIR/FUEL METERING SYSTEM AND THE IGNITION SYSTEM OF AN INTERNAL COMBUSTION ENGINE TO ENABLE THE ENGINE TO RUN WITH ALL NORMALLY AVAILABLE GRADES OF PETROL (GASOLINE) FUEL

The invention refers to a device for adapting the fuel/air metering system and the ignition system of an internal combustion engine to enable the engine to be run with all normally available grades of petrol (gasoline) fuel in accordance with the preamble to claim 1.

Modern, low-emission motor vehicles are currently equipped with a three-way catalytic converter and a $\lambda$ sensor (oxygen sensor) in order to reduce toxic emissions. It is important that combustion should take place with a stoichiometric ratio ($\lambda=1$) to enable the catalytic converter to operate at a high level of efficiency. The $\lambda$ sensor is therefore designed as an oxygen sensor, and forms part of a control loop for the fuel/air metering system.

The known three-way catalysts are damaged by operation with leaded fuel, so that catalyst-equipped vehicles have to be run on unleaded fuel.

However, unleaded fuel is not yet universally available in European countries outside Germany, or overseas. Therefore, in order to be able to run a catalyst-equipped vehicle in these countries as well, it is necessary to remove the catalytic converter and the $\lambda$ sensor to prevent them from being damaged by leaded fuel. A generally known method of achieving optimum efficiency of an internal combustion engine is to store an additional fuel/air map in the electronic control unit for the fuel/air metering system that is suitable for operation without catalytic converter ($\lambda\neq1$) as well as the fuel/air map intended for operation with catalytic converter ($\lambda=1$). Switching over from one map to the other is best carried out in the workshop when the catalytic converter is removed or installed by altering the position of a switch or by changing over a connecter (PIN coding).

In spite of this means of adapting the fuel/air metering system to the different operating conditions when the catalytic converter is removed, there remains the disadvantage that the engine cannot achieve optimum efficiency since the electronic control unit for the ignition timing is programmed with a timing map that is only adapted to the low RON/MON rating of unleaded fuel, and cannot be changed. It is also generally known that motor vehicles with internal combustion engines can be suited for operation with either premium fuel or regular fuel. This is necessary for countries in which premium fuel is not universally available, or where the quality of the premium fuel available is closer to that of regular fuel as marketed in the Federal Republic of Germany.

For operation with both grades of fuel there are two different ignition timing maps for premium fuel and regular fuel programmed in the electronics that control the ignition timing, and these have to be switched over manually by the driver as required when the tank is filled. The disadvantage of this switch-over arrangement is that it requires conscious action by the driver. Should the driver forget to switch over from premium to regular grade, there is a risk of high speed knock which, as is generally known, is inaudible and especially likely to cause engine damage. Additionally, if low quality premium grade fuel is used, with values that are closer to those of regular grade, this will not normally be realised by the driver, so that he will again fail to switch over the ignition as required. Apart from the risk of engine damage, this has the further disadvantage that the maximum performance capability is not achieved and that fuel consumption and exhaust emissions will be high.

The object of the invention is to create a means of adapting the fuel/air metering system and the ignition system of an internal combustion engine to enable the engine to be operated with all normally available grades of petrol (gasoline), at the same time protecting the engine from damage and achieving optimum fuel efficiency and low pollution levels by means of optimum regulation and control of the engine, at the same time eliminating the possibility of intervention by the operator of the internal combustion engine, particularly the driver of a motor vehicle, where such intervention could be of negative effect.

This purpose is achieved by means of the characteristic features described in claim 1.

In accordance with claim 1, a fuel/air metering system is provided with a facility for switching over between two pre-programmed fuel/air maps for $\lambda=1$ (combustion with a stoichiometric ratio for operation with a three-way catalytic converter and a $\lambda$ sensor for unleaded fuel) and for $\lambda\neq1$ for operation with leaded fuel. This switch-over facility can only be used in conjunction with the removal or installation of a catalytic converter and a $\lambda$ sensor. In accordance with the invention, it is therefore proposed that the switch-over should be effected manually by reversing or reconnecting a switch or plug connector in the workshop which removes or installs the necessary components for operation with catalytic converter. It is therefore not necessary for the driver of the vehicle to be aware of the possibility of switching over the fuel/air metering system, since the system is switched over by the workshop when the conversion is carried out.

In addition to the facility for switching over the fuel/air metering system manually, the invention also provides for a means of adapting ignition timing maps automatically for different fuel grades. For this purpose there are four different ignition timing maps stored in the ignition electronics: one is suitable and optimised for operation with premium grade unleaded fuel ($s_u$), one for regular grade unleaded ($n_u$), one for premium grade leaded ($s_b$) an a fourth for regular grade leaded ($n_b$).

When the specified conversion is carried out from operation with catalytic converter to operation without catalytic converter (from unleaded fuel to leaded fuel), in addition to manually switching over between the fuel/air maps, the ignition timing electronics are also initially switched over manually so that one of two pairs of ignition timing maps is selected, i.e. either $s_u$ and $n_u$ or $s_b$ and $n_b$, and this pair of timing maps is available for further processing. It is desirable to combine the switch-over of fuel/air maps from $\lambda=1$ to $\lambda\neq1$ and the switch-over of ignition timing maps from $s_u$ and $n_u$ to $s_b$ and $n_b$ so that they are effected together with the same switch or plug, which means that the correct combination is always obtained: for example the ignition timing maps for operation with unleaded fuel ($s_u$ and $n_u$) combined together with the fuel/air map for $\lambda=1$. However, the switch-over facilities can also be located separately, in which case it is important to ensure the correct combination.

Since the selection ad switch-over of the ignition timing maps for operation with or without catalytic converter is also carried out together with the removal or installation of the corresponding components by the workshop, there is no need for the driver of a motor vehicle to be aware of or informed about a switch-over facility.

Depending on the setting and the selection made by the workshop, there are thus two pairs of ignition timing maps for premium or regular grade fuel available in the ignition electronics, and these are already optimally suited for operation with unleaded or leaded fuel. In accordance with the invention, a further switch-over facility is now provided between the two ignition timing maps $s_u$ and $n_u$ (or $s_b$ and $n_b$). The switch-over is effected according to the output of a threshold sensor, which is connected to a transducer for at least one operating parameter of the combustion engine. The switch-over is effected automatically when a pre-determined threshold value is reached. Suitable operating parameters are critical temperature ranges or operating conditions which require a switch-over to protect the engine or to achieve optimised engine operation.

Both the manual and the automatic switch-over between two ignition timing maps, as described above, will normally be a switch-over between contacts of zero potential. Where necessary, the switch-over can also be affected by varying voltages at analogue inputs, for instance by applying or removing outside resistances or groups of resistors.

By virtue of the combination of manual switch-over settings in the workshop in conjunction with the removal or installation of a catalytic converter and a λ sensor and the automatic switch-over and adaptation to premium or regular grade fuel, the invention achieves a condition whereby the combustion engine is controlled and regulated in an optimum manner so that it can be operated with maximum fuel efficiency and low emissions, and protected against damage. At the same time, the driver has no opportunity for direct intervention, where errors could impair operating efficiency.

In accordance with claim 2, a switch-over is to be affected by means of the threshold sensor according to characteristic engine temperature parameters (water, oil, intake air) and/or ambient temperature and/or barometric pressure. According to the critical values of these factors, below which the corresponding threshold values are set, it is possible to determine when the automatic switch-over from the ignition timing map for premium grade fuel to the timing map for regular grade fuel is necessary, and when it is possible to switch back again.

A preferred embodiment is claimed in claim 3, which provides for an additional knock control facility of a type which, in itself, is generally known, and is superimposed on the ignition timing map control. As the operating parameter for the threshold sensor, this knock control system samples the knock frequency and/or the knock intensity, and when values exceed the threshold value, i.e. when intensive engine knock starts, the ignition timing map is switched over automatically from $s_u$ to $n_u$ (or from $s_b$ to $n_b$). If the ignition timing map $s_u$ were to be retained when the tank is filled with regular grade fuel, this would lead to intensive engine knock, or the knock control would retard the ignition timing. But for various reasons which, in themselves, are generally known, the knock control is only provided with a certain range of adjustment. Therefore, if the timing map $s_u$ were to be retained, the knock control would retard the ignition down to the lowest extreme of its range of adjustment. But since this range of adjustment is limited, this would possibly not be sufficient to prevent engine knock, so that apart from reduced efficiency, there would be the additional risk of engine damage. At any rate, however, the knock control would then be set at one extreme limit in such a way that it would practically no longer be available as an additional regulating factor superimposed on the pre-programmed ignition timing map. If, however, the system switches over automatically to the ignition timing map for regular grade fuel, the ignition timing control then operates with values that are already reduced overall, so that the knock control can again play an active part in the desired manner.

A further advantage of utilising a knock signal as the threshold value for the automatic switch-over is that all possible environmental and critical engine parameters and the octane values of the fuel collectively have an indirect influence in the way they affect the knock frequency. In this way, it is only necessary to sample one single threshold value for the desired switch-over function, and this is the knock frequency or the knock intensity. The corresponding circuitry can thus be made simple in construction and inexpensive.

In claim 4 it is proposed that the set threshold value for a switch-over should not be maintained constant for all operating conditions of the combustion engine, but should be varied according to changes in engine speed. Such variation, for instance, can be made continuous in accordance with engine speed, or in steps corresponding to certain engine speed ranges. The threshold values will normally be set lower in the lower engine speed ranges, where engine knock hardly occurs.

It is known that, by reason of the construction of a combustion engine, not all cylinders are equally susceptible to knock. For increased reliability of the automatic switch-over function described in the invention, claim 5 proposes that the threshold value should be derived from the cylinder which is most susceptible to knock, or from a mean value of several cylinders.

In order to maintain the automatic switch-over as a stable control process and to avoid continuous switching back and forth at threshold ranges with unstable conditions, it is proposed in claim 6 that the system should not switch back automatically out of the regular timing map or take a repeated sample of the switch-over threshold value until after a certain pre-set delay period has elapsed. This delay period can either be determined as actual elapsed time or as a certain number of combustions.

In accordance with claim 7, depending on conditions, it may be desirable to make the delay period variable according to engine speed or engine speed ranges.

In claim 8 it is emphasised that the switch-over function operating according to the engine knock tendency, as provided by the invention, can be implemented with a knock control system which is, in itself, generally known, and may or may not operate selectively for the individual cylinders.

By way of example, one version of the invention is described below with further characteristics, details and advantages.

Figure 2:
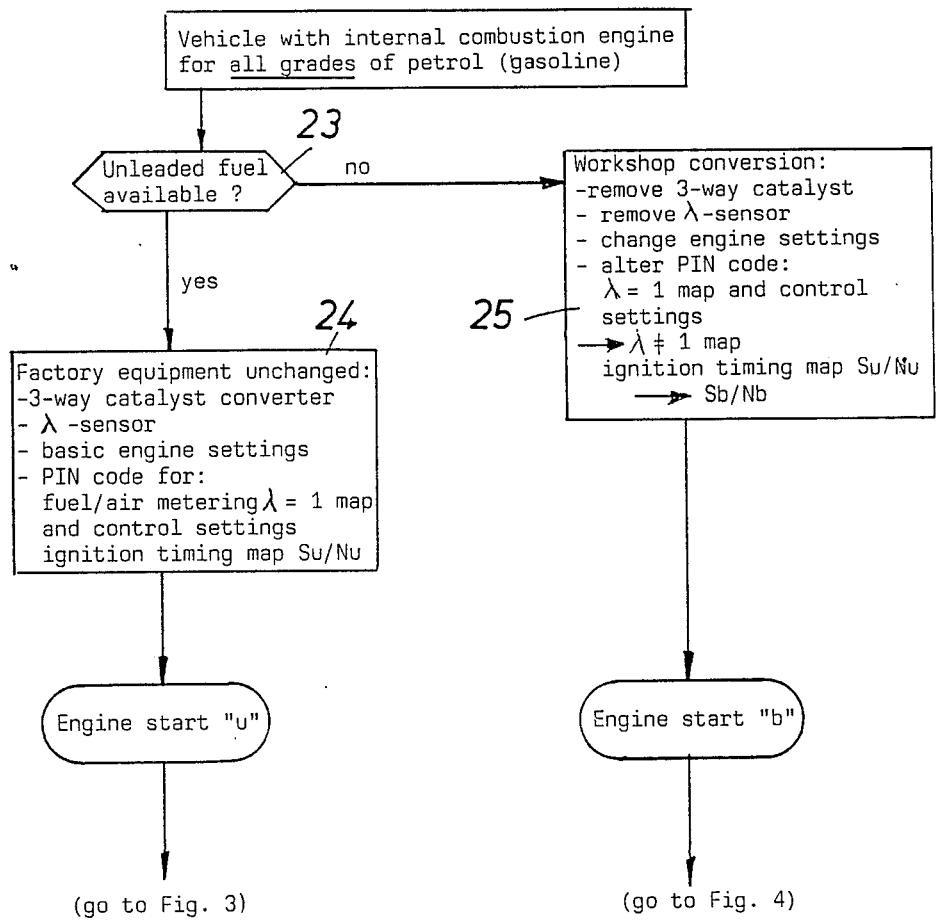
Figure 3:
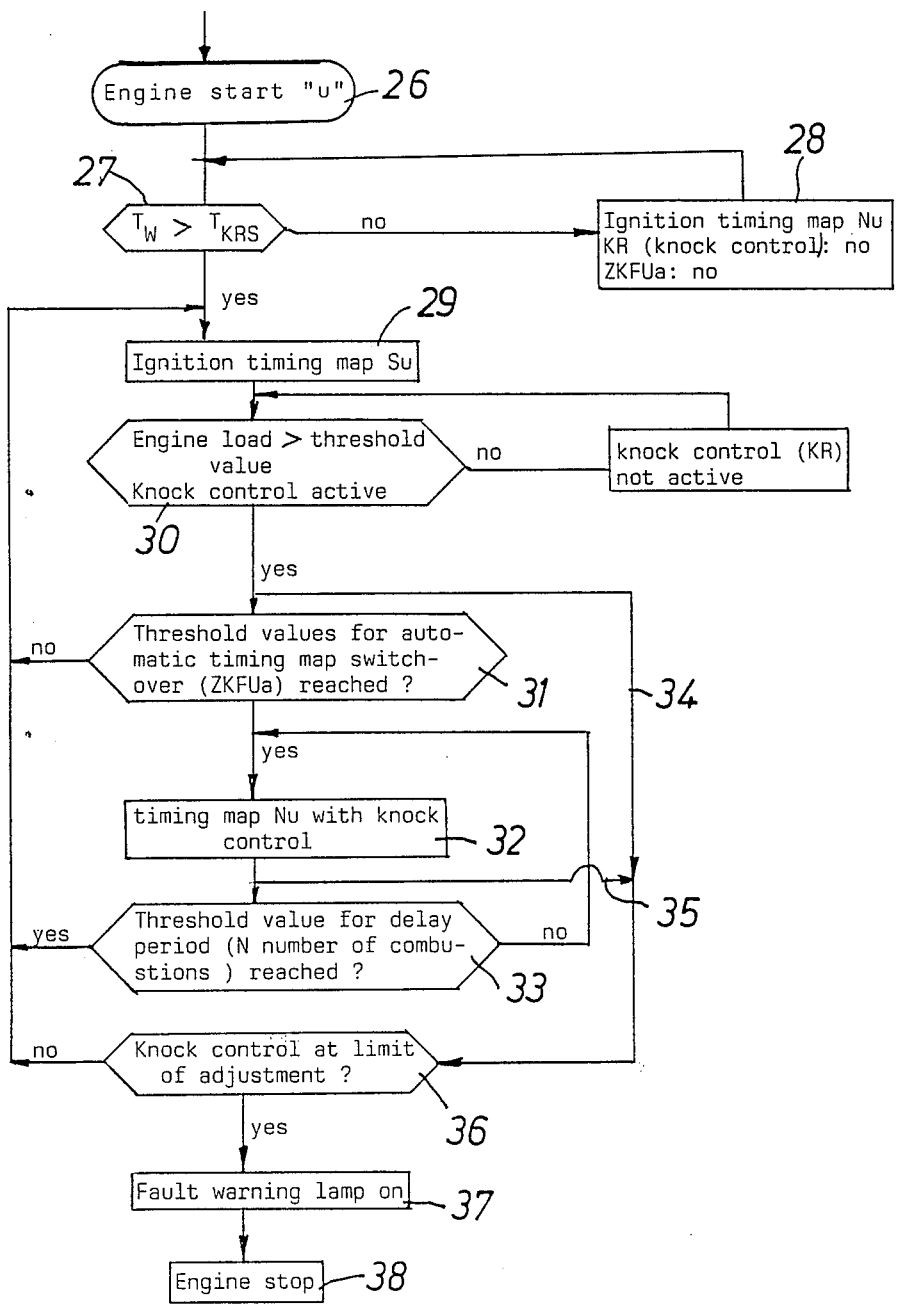
Figure 4:
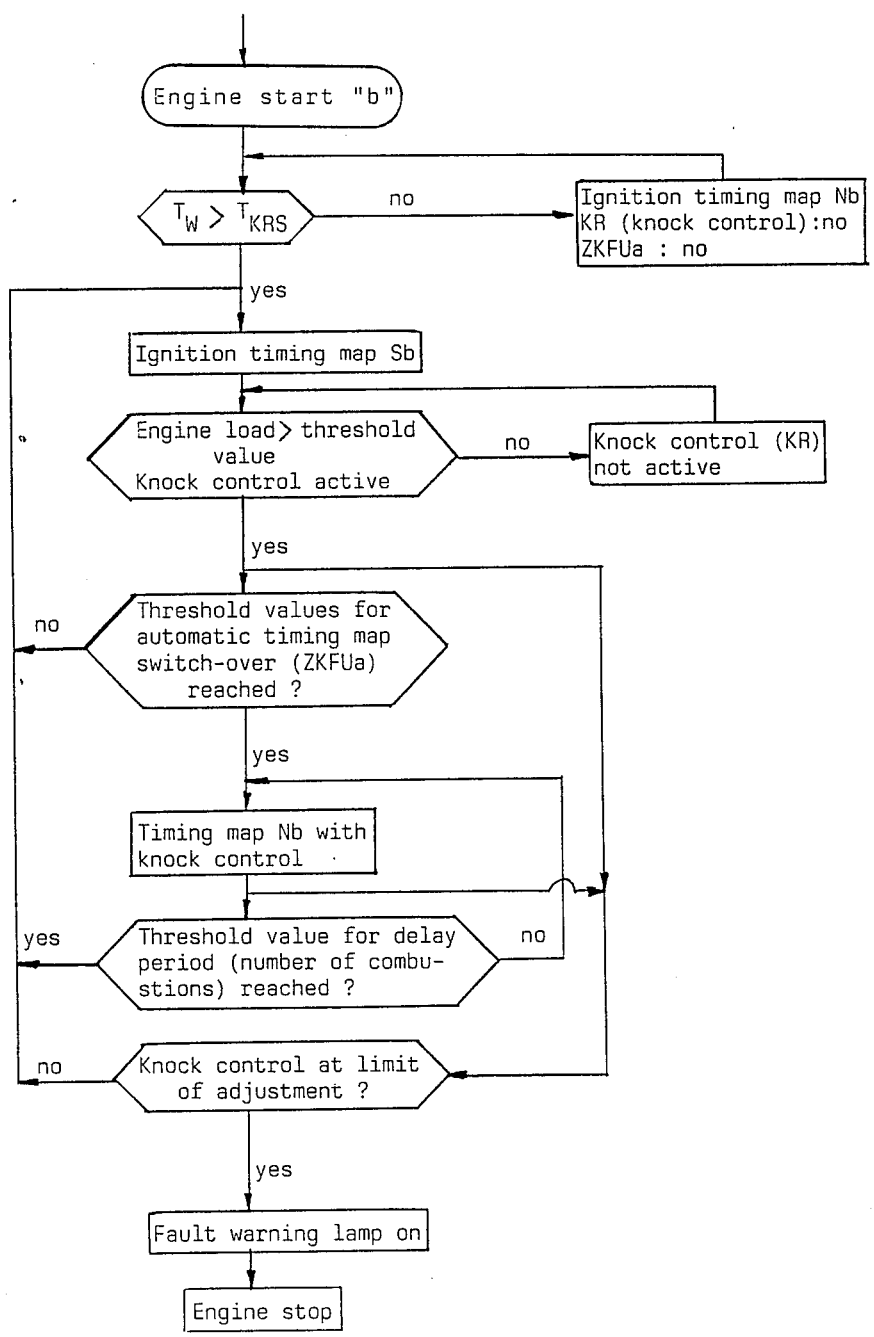

FIG. 1 shows the schematic circuit diagram of a device for adapting the fuel/air metering system and the ignition system of an internal combustion engine, FIG. 2 shows the first part of a flow diagram illustrating the switching functions, and FIGS. 3 and 4 show the continuation of the flow diagram in FIG. 2.

FIG. 1 is a schematic circuit diagram of a device for adapting the fuel/air metering system and the ignition system of an internal combustion engine to enable the engine to operate with all normally available grades of petrol (gasoline), including an electronic control unit 1 for the fuel/air metering which receives signals representing a number of operating parameters, such as cylinder temperature, throttle switch position, λ sensor signal, etc., as schematically indicated by arrows 2. The electronic control unit 1 has a switchable output signal (arrow 3) going to the servo unit which regulates the amount of fuel injected. By means of a switch or plug 4, the signal 3 can be switched over to a regulating output for $\lambda = 1$ (lower branch 5) or to a regulating or constant output for $\lambda \neq 1$ (upper branch 6). This function is switched over by the workshop in conjunction with the removal or installation of a catalytic converter and λ sensor.

A number of operating parameters is also fed to an electronic control unit 7 for the ignition or the ignition timing, as indicated by arrows 8. The diagram also shows a memory unit 9 (which is actually incorporated in the electronic control unit 7), in which four ignition timing maps for leaded and unleaded premium grade fuel and for leaded and unleaded regular fuel are stored. Corresponding outputs are marked $s_u$, $s_b$ and $n_u$ and $n_b$ respectively. By means of the two arms 10, 11 of a switch, which can be coupled together with switch 4 as illustrated, the workshop can manually select or switch over to two of the four available ignition timing maps, at the same time as switching over the λ setting on control unit 1. In the example illustrated the ignition timing maps $s_u$ and $n_u$ have been switched through to the two control connections 12, 13.

One of these control connections 12, 13 can be switched through for processing in the electronic control unit 7 by means of an automatic switching unit illustrated as switch 14. In the illustrated example this is the ignition timing map $s_u$.

In order to recognise knock occuring during operation of the combustion engine, a knock sensor 15 is provided and connected to an evaluating circuit 16, of a type which is generally known, and which passes a signal representing knock frequency and knock intensity to control unit 7 via connection 17. According to the knock tendency, the control unit then gradually retards the ignition timing over certain periods of time (step width) and by a certain value (step height) in a manner which is generally known.

The knock signal carried by electrical lead 17 is fed to a threshold sensor, represented by a comparator 18, via lead 19. A threshold signal 20, which is variable according to engine speed n or other parameters by means of a switching unit 21, is fed to a further input. When the knock signal in lead 19 exceeds the threshold signal in lead 20, the sensor unit 18 trips switch 14 (indicated by arrow 22), which switches over from the ignition timing map $s_u$ to timing map $n_u$.

The function of the circuitry shown in FIG. 1 is explained further by means of the diagrams in FIGS. 2 to 4, with a number of additional specific influencing factors and switching conditions.

FIG. 2 refers to a motor vehicle with a combustion engine capable of using all grades of petrol (gasoline), where, in alternative 23, it is to be determined whether unleaded fuel is available. If this is the case, as in step 24, the equipment of the vehicle with catalytic converter is left unchanged, i.e. with three-way catalytic converter installed, λ sensor installed, the PIN coding for the fuel/air metering unit set for $\lambda = 1$ and the setting for the two ignition timing maps $s_u$ and $n_u$.

If, however, no unleaded fuel is available, the workshop carries out step 25 and removes the three-way catalytic converter and the λ sensor, and switches over manually to the engine map for $\lambda \neq 1$ and the ignition timing maps $s_b$ and $n_b$. This is equivalent to repositioning the switches 4, 10 and 11 in FIG. 1.

The control and regulating process after the engine start 26 in the setting "u" (unleaded) is explained in FIG. 3.

After the engine start 26, it is determined in step 27 whether the water temperature $t_w$ is above a critical threshold $t_{KRS}$. If this is not the case, as shown in step 28, the ignition timing map $n_u$ is switched on and neither the knock control nor the automatic switch-over function between the ignition timing maps (ZKFUA) are activated.

If the water temperature is above the threshold, as in step 29, the system switches over to the ignition timing map for premium grade fuel ($s_u$).

In step 30 it is determined whether the engine load value is above a certain threshold. If this is not the case, the knock control (KR) is not activated. However, if the load threshold is exceeded, alternative 31 determines whether the threshold value or values, preferably a knock threshold value, for the automatic ignition timing map switch-over has been reached. If the knock tendency is below the threshold value, the system switches back to an earlier point in the sequence before step 29, and the ignition timing map $s_u$ remains active.

However, if the threshold value for the automatic switch-over has been reached, step 32 activates the second ignition timing map $n_u$ with superimposed knock control.

After a certain delay period or a certain number of combustions shown as alternative 33, the sequence recommences before step 29, and the system tries to switch back again to the timing map for premium fuel and to retain this setting. Via an additional branch 34, which diverges before 31, or a branch 35, step 36 determines whether the knock control has already reached its maximum limit of adjustment. If this is the case, a fault warning lamp is activated in step 37, or if applicable the control process or even the engine itself is stopped after step 38.

FIG. 4 shows the switching functions and control process after engine start with the settings for leaded fuel, indicated by the letters "b". The process in FIG. 4 is the same as that in FIG. 3, except that FIG. 4 shows an automatic switch-over between the ignition timing maps $s_b$ and $n_b$. The description given for FIG. 3 is thus also applicable to FIG. 4.

The process is timed so that the individual steps are carried out within seconds, with the exception of the delay period in alternative 33 which, depending on other parameters, will preferably be a period of minutes up to about 30 minutes.

In summary, it can be said that the invention constitutes a means of adapting the fuel/air metering system and the ignition system of an internal combustion engine to enable the engine to be run with all normally available grades of petrol (gasoline), at the same time allowing the best possible fuel efficiency with low emissions, and virtually eliminating the risk of incorrect engine settings or adjustments.

What I claim is:

1. Device for adapting the fuel/air metering system and the ignition system of an internal combustion engine to enable the engine to run with all normally available grades of petrol (gasoline) fuel, with a fuel/air metering system capable of being switched over from a fuelair map for $\lambda=1$ (combustion with a stoichiometric ratio; operation with 3-way catalytic converter and $\lambda$ sensor (oxygen sensor) with unleaded fuel) to a fuel/air map for $\lambda \neq 1$, with an ignition system with several pre-programmed ignition timing maps and a facility for switching over between timing maps, characterised in that, four ignition timing maps ($s_u$, $n_u$, $s_b$, $n_b$) are programmed in the memory, one being suited for operation with premium unleaded fuel ($s_u$), one for regular unleaded fuel ($n_u$), one for premium leaded fuel ($s_b$) and a fourth for regular leaded fuel ($n_b$), and that the fuel/air metering system (1) can be switched over with a hand-operated switch (4) or a plug and an initial switch-over can be made between the two pairs of ignition timing maps $s_u/s_b$ and $n_u/n_b$ (switches 10,11), so that the air/fuel map $\lambda=1$ and the ignition timing maps $s_u$ and $n_u$ are available when the combustion engine is operated with unleaded fuel, and the air/fuel map $\lambda \neq 1$ and the ignition timing maps $s_b$ and $n_b$ are available when the engine is run on leaded fuel, and that a further automatic switch-over unit (14), which becomes effective after the first switch-over between the ignition timing maps, is provided, and this switch-over unit, depending on the position of the first switch-over (10, 11), switches over between the ignition timing maps $s_u$ and $n_u$, or $s_b$ and $n_b$, according to the output of at least one threshold sensor (18) for at least one operating parameter of the internal combustion engine.

2. Device in accordance with claim 1, characterised in that the operating parameter(s) fed to the threshold sensor (18) represents at least one characteristic engine temperature condition (water, oil, intake air) and/or ambient temperature and/or barometric pressure.

3. Device in accordance with claim 1, characterised in that the combustion engine is provided with a knock control system of a type which is generally familiar and which is superimposed on the ignition timing map control set-up, whereby the operating parameter for the threshold sensor (18) is the knock frequency and/or knock intensity (19), so that the ignition timing map switches from $s_u$ to $n_u$ or from $s_b$ to $n_b$ when values are above the threshold.

4. Device in accordance with claim 3, characterised in that the programmed threshold value can be varied with the engine speed of the internal combustion engine.

5. Device in accordance with claim 3 or 4, characterised in that the threshold value is taken from the most knock-sensitive cylinder or from the mean value of at least two cylinders.

6. Device in accordance with claim 1 characterized in that a delay period (33), determined by one of an elapsed time and a certain number of combustions, elapses before the system automatically switches back at least from one of a group of events consisting of the transitions from $n_u$ to $s_u$, from $n_b$ to $s_b$, and before the next interrogation of the switchover threshold.

7. Device in accordance with claim 6, characterised in that the pre-programmed delay period (33) is variale with the engine speed of the internal combustion engine.

8. Device in accordance with claim 3 characterized in that the anti-knock system may be selective for the individual cylinders.

* * * * *